US011961396B2

(12) United States Patent
Davis, Jr.

(10) Patent No.: US 11,961,396 B2
(45) Date of Patent: Apr. 16, 2024

(54) EMERGENCY VEHICLE WARNING INDICATION SYSTEM

(71) Applicant: Milton Davis, Jr., Warner Robins, GA (US)

(72) Inventor: Milton Davis, Jr., Warner Robins, GA (US)

( * ) Notice: Subject to any disclaimer, the term of this patent is extended or adjusted under 35 U.S.C. 154(b) by 83 days.

(21) Appl. No.: 17/626,468

(22) PCT Filed: Jul. 13, 2020

(86) PCT No.: PCT/US2020/041864
§ 371 (c)(1),
(2) Date: Jan. 11, 2022

(87) PCT Pub. No.: WO2021/007582
PCT Pub. Date: Jan. 14, 2021

(65) Prior Publication Data

US 2022/0284810 A1 Sep. 8, 2022

Related U.S. Application Data

(60) Provisional application No. 62/872,995, filed on Jul. 11, 2019.

(51) Int. Cl.
*G08G 1/087* (2006.01)
*G08G 1/005* (2006.01)
(Continued)

(52) U.S. Cl.
CPC ............. *G08G 1/087* (2013.01); *G08G 1/005* (2013.01); *G08G 1/052* (2013.01); *G08G 1/056* (2013.01);
(Continued)

(58) Field of Classification Search
None
See application file for complete search history.

(56) References Cited

U.S. PATENT DOCUMENTS 5,977,883 A 11/1999 Leonard et al.
6,326,903 B1 12/2001 Gross et al.
(Continued)

FOREIGN PATENT DOCUMENTS

CN 102110372 B 4/2013
DE 202011100200 U1 3/2012
(Continued)

OTHER PUBLICATIONS

International Search Report and Written Opinion dated Oct. 29, 2020 cited in Application No. PCT/US20/41864, 13 pgs.
P. Mahadik et al., Apr. 22, 2019, Form 2—Complete Specification.

*Primary Examiner* — John F Mortell
(74) *Attorney, Agent, or Firm* — BEKIARES ELIEZER LLP

(57) ABSTRACT

An Emergency Vehicle Warning Indication system is provided. Disclosed herein are systems and methods for providing notification of emergency vehicles in advance of the approaching intersection further comprising one or more Control Modules or Modular Transmitters that receive and transmit a high secured radio frequency. This secured radio frequency may be further configured such that it is used only by Emergency Vehicles. The system and method further comprising a means for overriding the traffic signal sequence of the traffic signal system at the intersection. The system and method further comprising an emergency lighting system. Wherein the emergency lighting system may operate in conjunction with at least one of the traffic signal system, the emergency vehicle, and one or more Control Modules or Modular Transmitters.

17 Claims, 7 Drawing Sheets

(51) Int. Cl.

| | |
|---|---|
| ***G08G 1/052*** | (2006.01) |
| ***G08G 1/056*** | (2006.01) |
| ***G08G 1/09*** | (2006.01) |
| ***G08G 1/0965*** | (2006.01) |
| ***G08G 1/16*** | (2006.01) |

(52) U.S. Cl.
CPC ............. *G08G 1/09* (2013.01); *G08G 1/0965* (2013.01); *G08G 1/164* (2013.01); *G08G 1/166* (2013.01)

(56) References Cited

U.S. PATENT DOCUMENTS

| | | | | |
|---|---|---|---|---|
| 6,958,707 | B1 | 10/2005 | Siegel | |
| 8,094,040 | B1 | 1/2012 | Cornett et al. | |
| 9,934,685 | B1 * | 4/2018 | Bernhardt .............. | G08G 1/095 |
| 2002/0105432 | A1 | 8/2002 | Pederson et al. | |
| 2005/0035878 | A1 | 2/2005 | Vassilevsky | |
| 2007/0040700 | A1 * | 2/2007 | Bachelder .............. | G08G 1/087 340/902 |
| 2011/0109478 | A1 * | 5/2011 | Williamson ........... | G08G 1/087 340/906 |
| 2011/0187559 | A1 | 8/2011 | Applebaum | |
| 2013/0027221 | A1 * | 1/2013 | Johnson ................. | G08G 1/087 340/902 |
| 2015/0243165 | A1 * | 8/2015 | Elsheemy ........ | G08G 1/096775 340/906 |
| 2020/0098253 | A1 * | 3/2020 | Zeplin .................... | G08G 1/081 |
| 2021/0012656 | A1 | 1/2021 | Davis, Jr. | |

FOREIGN PATENT DOCUMENTS

| | | | |
|---|---|---|---|
| MX | 2013002541 | A | 9/2014 |
| WO | 2019040024 | A2 | 2/2019 |

* cited by examiner

EMERGENCY VEHICLE WARNING INDICATION SYSTEM

RELATED APPLICATIONS

The present application is a U.S. National Stage under 35 U.S.C. § 371 of International Application No. PCT/US20/41864 filed on Jul. 13, 2020, which claims benefit under the provisions of 35 U.S.C. § 119(e) of U.S. Provisional Application No. 62/872,995 filed on Jul. 11, 2019, and having inventors in common, which are incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF INVENTION

The present invention relates to a system for improving traffic safety for pedestrians and motorists as it relates to warning of oncoming emergency vehicles.

BACKGROUND OF THE INVENTION

In some situations, when an emergency vehicle is approaching a busy intersection, there may be a safety risk posed by the oncoming emergency vehicles to motorists and pedestrians. Thus, the conventional strategy is to use sirens and flashing lights in an attempt to alert motorists and pedestrians of the approach of an emergency vehicle. This often causes problems because the conventional strategy does not account for motorists and pedestrians unable to hear the siren, obstruction of the lights from view, and the traffic signals operating at the busy intersection. For example, motorists or pedestrians may be unable to hear the sirens over the sound system in their vehicle or their music player device. The motorists or pedestrians may be preoccupied on their smartphone, on a phone call, or otherwise distracted.

Accordingly, there remains a need for improved methods and systems for providing emergency vehicle warning to a motorists and pedestrians for traffic systems. This need and other needs are satisfied by the various aspects of the present disclosure.

SUMMARY OF THE INVENTION

In accordance with the purposes of the invention, as embodied and broadly described herein, the invention, in one aspect, relates to improving traffic safety for pedestrians and motorists as it relates to warning of oncoming emergency vehicles, such as, for example providing a system and method for giving notification of emergency vehicles in advance of the approaching intersection. In further aspects, system and method for giving notification of emergency vehicles in advance of the approaching intersection may further be determined by a predetermined distance.

In another exemplary aspect, the invention relates to a system and method for giving notification of emergency vehicles in advance of the approaching intersection further comprising one or more Control Modules or Modular Transmitters that receive and transmit a high secured radio frequency. This secured radio frequency may be further configured such that it is used only by Emergency Vehicles.

In further aspects, the invention also relates to a system and method for giving notification of emergency vehicles in advance of the approaching intersection further comprising a means for overriding the traffic signal sequence of the traffic signal system at the intersection.

In further aspects, the invention also relates to a system and method for giving notification of emergency vehicles in advance of the approaching intersection further comprising an emergency lighting system. The emergency lighting system may operate in conjunction with at least one of the traffic signal system, the emergency vehicle, and one or more control Modules or Modular Transmitters.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

FIG. 7 shows a depiction of various calculations generated and used in connection with an emergency vehicle warning indication system in accordance with an exemplary embodiment of the present invention.

DETAILED DESCRIPTION OF THE INVENTION

Figure 1A:
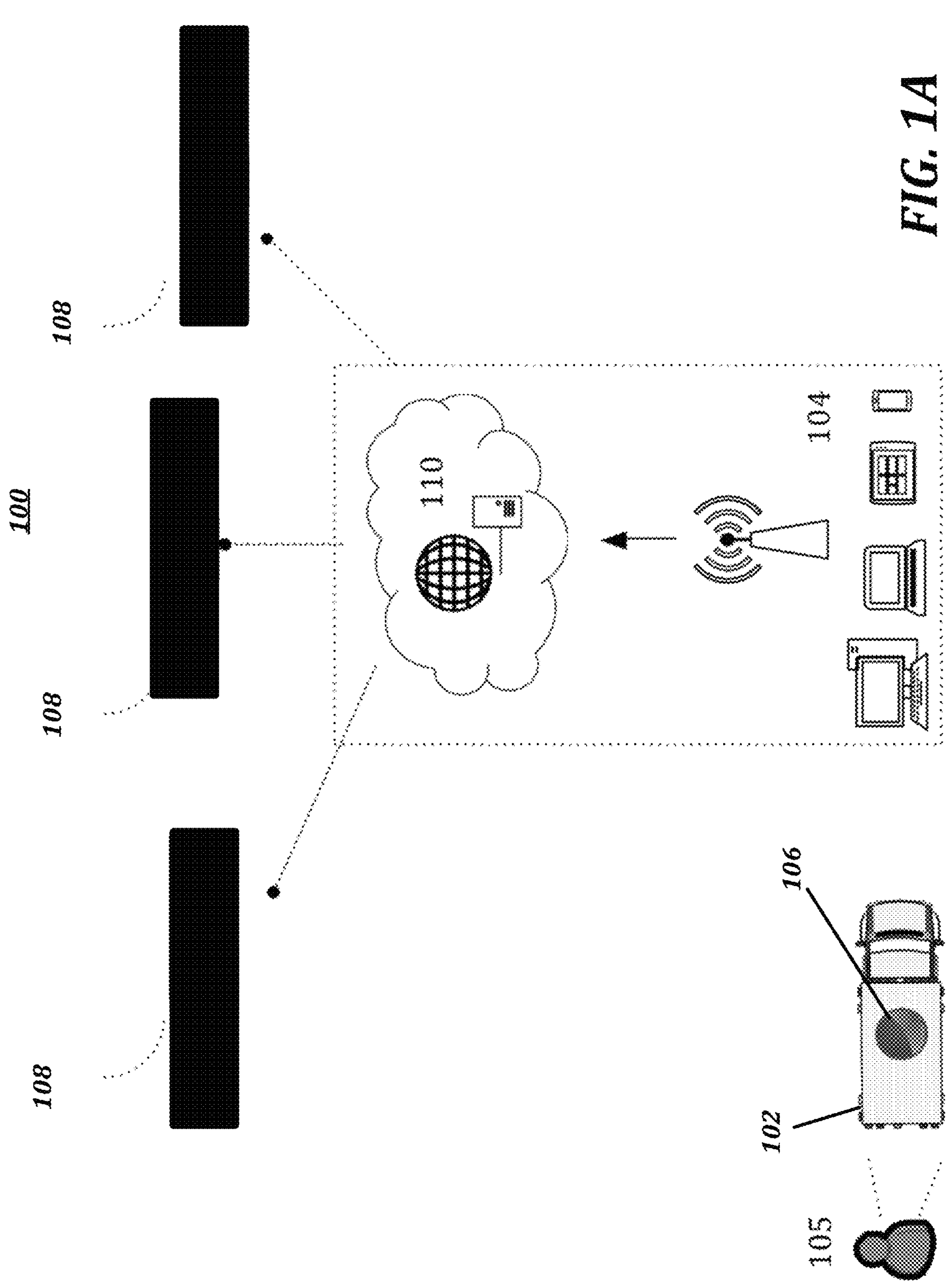
FIGS. 1A and 1B shows depictions of an operating environment comprising traffic signals, an emergency vehicle, and a means for transmitting, and a means for receiving in accordance with an exemplary embodiment of the present invention.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

As used herein, the terms "traffic light" or "traffic signal" means any traffic sign, railroad crossing, traffic light, traffic signal, red light, yellow light, green light, flashing yellow light, flashing red light, stop sign, yield sign, crosswalk notification, speed limit sign, and any other traffic road sign for motorists, pedestrians, or vehicles of any type.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the invention as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Emergency Vehicle Warning Devices and Systems

As briefly described above, the present disclosure relates, in various aspects, to providing a system and method for giving notification of emergency vehicles in advance of the approaching intersection.

In one aspect, the present disclosure provides a system and method for giving notification of emergency vehicles in advance of the approaching intersection may further be determined by a predetermined distance. In further aspects, the present disclosure relates to a system and method for giving notification of emergency vehicles in advance of the approaching intersection further comprising one or more Control Modules or Modular Transmitters that receive and transmit a high secured radio frequency. In still further aspects, the secured radio frequency may be further configured such that it is used only by Emergency Vehicles.

In even further aspects, the invention also relates to a system and method for giving notification of emergency vehicles in advance of the approaching intersection further comprising a means for overriding the traffic signal sequence of the traffic signal system at the intersection.

In further aspects, the invention also relates to a system and method for giving notification of emergency vehicles in advance of the approaching intersection further comprising an emergency lighting system. The emergency lighting system may operate in conjunction with at least one of the traffic signal system, the emergency vehicle, and one or more control modules or modular transmitters.

In further aspects, the disclosed devices further comprising a means for overriding a traffic signal sequence. In still further aspects, the device can be useful for providing an emergency vehicle warning indication system.

The present disclosure includes many aspects and features. Moreover, while many aspects and features relate to, and are described in, the context of an emergency vehicle warning indication platform, embodiments of the present disclosure are not limited to use only in this context.

I. Platform Overview

Consistent with embodiments of the present disclosure, an Emergency Vehicle Warning Indication System may be provided. This overview is provided to introduce a selection of concepts in a simplified form that are further described below. This overview is not intended to identify key features or essential features of the claimed subject matter. Nor is this overview intended to be used to limit the claimed subject matter's scope. The Emergency Vehicle Warning Indication System may be used by individuals or companies to alert motorists and pedestrians that an emergency vehicle is approaching the intersection; override the traffic signal controllers at the intersection; and/or activate a strobe or auxiliary lighting system that is connected to the traffic signals.

In some aspects, the platform may be a stand-alone platform, enabled to provide the various interface aspects for traffic management and traffic control facilitation. In other embodiments, the platform may be integrated into existing traffic management and/or traffic control platforms.

The emergency vehicle warning platform may be populated with information pertaining to specific, real-time and/or calculated geographical locations. The information may include, but not be limited to, for example, data corresponding to the locations of emergency vehicles such as ambulances, police cars, fire trucks, and the like. The information may include various data associated with an emergency vehicle, including one or more of location data associated with an emergency vehicle location, GPS data associated with GPS coordinates, speed data associated with an emergency vehicle speed, image data associated with an emergency vehicle captured by the platform, radar data associated with an emergency vehicle, sound data associated with an emergency vehicle's siren, signal data and the like. Furthermore, the platform may be populated with data corresponding to nearby non-emergency vehicles.

The platform may receive information corresponding a current location and/or destination location of an emergency vehicle. The platform may then generate information relevant to the location data of an approaching emergency vehicle, and may provide traffic intersections with said information. The platform may further provide a visual notification at the traffic intersection. Once the visual notification has been activated, the platform through the visual notification may provide information such as visual alerts or cues to the nearby cars and pedestrians relevant to the emergency vehicle at the intersections that may be on the route. The platform may further track the emergency vehicle location, at least through the intersection, and transmit the emergency vehicle location information to one or more other traffic intersections.

In various aspects, the device may be configured to provide visual notification and/or alerts including at least one visual cue that is effective to alert a nearby motorist. At least a portion of the visual notification area of the intersection control module may correspond to at least a portion of an outer surface of the housing. The alert area of the housing may also comprise at least one light element capable of producing and delivering illuminated alerts to nearby motorist and/or pedestrians. In some aspects, the notification area may comprise at least one light element comprising at least one of flashing LEDs, incandescent lights, florescent lights, LED array, a LED matrix which could be programmed to display words or warnings, a digital screen, and combinations thereof. In other aspects, the at least one lighting element may comprise at least one of: light emitting diodes (LEDs), incandescent lights, florescent lights, LED array, a LED matrix which could be programmed to display words or warnings, and a digital screen. In even further aspects, there may be a plurality of lighting elements. The lighting element may be disposed on a surface or contained within a housing. In some aspects, lighting elements may be disposed on multiple faces of the housing, for example, on the front and rear faces.

In one aspect, the system may be configured to operate by placing or installing a vehicle control module in an emergency vehicle (EV) and an intersection control module mounted in a traffic intersection. In one aspect, when an emergency vehicle approaches and is within predetermined distance from an intersection, the transceiver in the vehicle control module, which may be constantly broadcasting location data associated with the EV, is picked up by the transceiver in intersection control module at the intersection to them activate a visual notification using lights on the intersection control module to notify vehicles at or near the intersection of the approaching emergency vehicle.

In further aspects, the Emergency Vehicle Warning Indication System may be configured interface with the traffic signal systems for controlling such systems. For example, the platform may be installed at a 4-way intersection such that control of three or four traffic signals at a road intersection may be exercised when an EV approaches said intersection. The traffic signals may be controlled such that three of the traffic signals are forced to a CONSTANT RED. Furthermore, the traffic signals may be configured such that the one remaining traffic signals may be changed to provide a visual notification or alert, such as FLASH GREEN, and/or RED, and/or YELLOW, this remaining traffic signal facing in the direction as road traffic of the approaching emergency vehicle.

In further aspects, this visual notification may notify passenger vehicles and motorists to proceed through the intersection with caution; clear the way for the oncoming emergency vehicle; or stop and pull to the right of the roadway until the oncoming emergency vehicle has passed. To this end, there may be specific or unique visual notifications corresponding specific desired messages to be conveyed to nearby vehicle, such as described above and herein.

In another aspect, after the emergency vehicle has proceeded through the intersection by a predetermined distance, for example, at least about 30 yards, the vehicle control module may send a signal to the and/or the intersection control module may detect the EV has passed through the intersection, causing the traffic signal system to return to normal operation.

In another aspect, the present disclosure provides a feature of transmitting a radio frequency signal to one or more light assemblies that are mounted above the one or more traffic signals of a given intersection. In some embodiments, the light assemblies may be integrated with the intersection control module. In other embodiments, the light assemblies may be separated from the intersection control module. The light assembly is configured to transmit visual notifications or alerts, which may comprise flashing one or more colors including but not limited to blue, white, orange, yellow, red, red and blue, purple, or any other color suitable for notification. The light assembly may be configured such that it may effective to notify all nearby passenger vehicles and motorists in advance of an emergency vehicle approaching the intersection.

In further aspects, the light assembly may provide a visual notification of approaching emergency vehicles. In some aspects, the light assembly may operate or be controlled by other components of the platform, such as, for example, the intersection control module controller. In other aspects, the light assembly may include circuitry and hardware to allow it to operate independently on its own, for example, in the event the system is off-line or when it is unable to communicate with other components of the platform. For example, the light assembly may comprise integrated sensors configured to detect siren or other signal from the EV which are activated only when certain system criteria are met, such as when the system if off-line or communication is lost with the intersection control module.

In another aspect, the light assembly may comprise one or more miniaturized strobes. The one or more strobes may be configured such that they have a size ranging from 1" L×1"H×1" W; to 14" L×6" H×5" W; to 36" L×36" H×36" W. In another aspect, the light assembly may comprise six bulbs rendering between 5 feet to 1000 feet range of lux intensity output lighting. In another aspect, the light assembly, may provide for immediate visual emergency awareness.

In yet another aspect, the light assembly may comprise blue light strobes having integrated technology detection. In a further aspect, the light assembly may further comprise a combination of both light-based and audio-based detection. Furthermore, in additional aspects, the light assembly may be configured to receive and respond signals and/or communications including but not limited to multiple flashing light sequence patterns and/or multiple radio frequency codes being registered from one or more emergency vehicles. The communication between system modules and/or components may be received or transmitted from a predetermined distance ranging from about 5 yards to about 1000 yards or more from the intersection, for example, from about 10, 20, 30, 40, 50, 60, 70, 80, 90, 100, 125, 150, 200, 300, 400, 500, 600, 700, 800, 900, or 950 yards. In another aspect, communication between system modules and/or components may be disabled within a predetermined distance ranging from about 1 yard to 500 yards or more after exiting the intersection, for example, from about 10, 20, 30, 40, 50, 60, 70, 80, 90, 100, 125, 150, 200, 300, 400, or 450 yards. In yet another aspect, communication between system modules and/or components may be in a constant state of transmission. In a further aspect, communications between system modules and/or components may be in a constant state of transmission until the emergency vehicle has arrived at its destination.

In further aspects, the light assembly may further be configured with four miniaturized blue light strobes affixed to the four traffic signals above the intersection. The light assembly may be configured such that as an emergency vehicle approaches the intersection while transmitting communications comprising one or more flashing light sequence patterns and/or one or more radio frequency codes at least 150 yards prior entering the intersection.

In yet another aspect, the light assembly may be configured as a blue light strobe system that can first detect an approaching emergency vehicle. The light assembly may comprise one or more blue light strobes, each affixed to one or more traffic signals at the intersection. This light assembly may be configured such that the blue light strobe closest to the approaching emergency vehicle may be activated first. This light assembly may be configured such that a first activated blue light strobe becomes the controlling blue light of the system. The first activated blue light strobe may begin to flash a series of blue and yellow lights. The first activated Blue Light Strobe may command the other one or more Blue Light Strobes to flash a series of Blue Lights. The Blue Light Strobes may be further configured to disable all flashing lights at the said traffic signals at least after the emergency vehicle has exited the intersection at least 30 yards. At this point, all strobes may be disabled until it is determined that another emergency vehicle is approaching.

In further aspects, each strobe of the light assembly may be equipped with a Self-Recharging Solar power assembly. The Self-Recharging Solar power assembly may be configured to provide power in the event of power outages. The Self-Recharging Solar power assembly may be configured such that it may reliably operate for at least up to 50 activations for at least every 12 hours of exposure to sunlight.

In various aspects, the light assembly may comprise a universal mounting. The universal mounting may be configured such that it can be mounted to sign posts, light poles, light pole booms, vertical or horizontal boom mountings.

In further aspects, the system may provide visual notifications which may be unique warning indications for each type of emergency vehicles. In still further aspects, the warning indication may be identical or unique for multiple emergency vehicles approaching the same intersection at substantially the same time. In still further aspects, the system may change the one or more properties of the warning indication (color, sequence, etc.) based on at least one of: anticipated or estimated intersection entrance times, order of entry into an intersection, traffic lane when approaching the intersection, and the like.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

According to various further aspects of the invention, the emergency vehicle warning indication devices and systems can comprise multiple configurations. For example, various exemplary embodiments of the inventive devices and systems are shown in FIGS. 1, 2, 4, and 5-7.

Figure 1B:
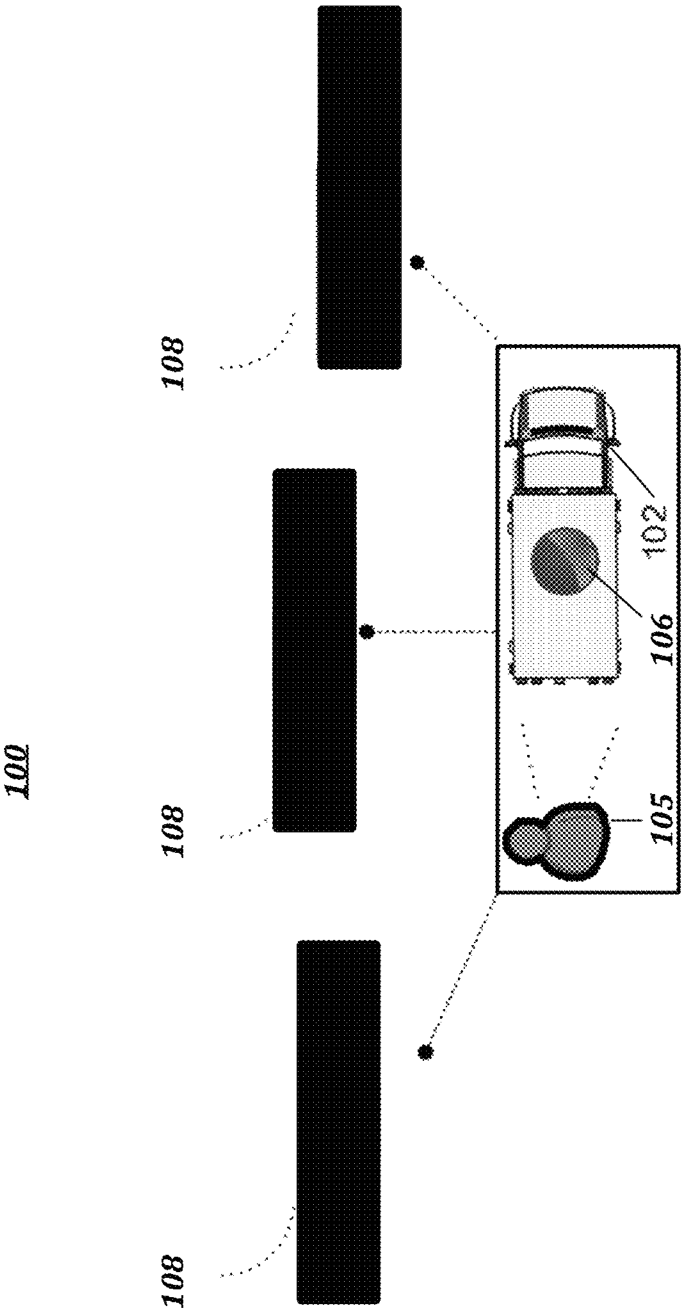

FIGS. 1A and 1B illustrate one possible operating environment through which a platform consistent with embodiments of the present disclosure may be provided. By way of non-limiting example, an emergency vehicle warning indication platform 100 may be hosted on a centralized server 110, such as, for example, a cloud computing service. A user 105 may access platform 100 through a software application. The software application may be embodied as, for example, but not be limited to, a website, a web application, a desktop application, and a mobile application compatible with a computing device 500.

As will be detailed with reference to FIG. 5 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

In various aspects, the Figures show various views and features of an exemplary device for providing an emergency vehicle warning indication system in accordance with the present disclosure. In these embodiments, the emergency vehicle warning indication system is depicted in FIGS. 1A and 1B. A user 105 residing in emergency vehicle 102 may activate an emergency vehicle warning indication device 106 when an emergency call is received or dispatched to the emergency vehicle 102. The emergency vehicle warning indication device 106 may be one or more of a smartphone, computer, laptop, personal digital assistant (PDA), tablet, or other computing device as depicted in FIGS. 1A and 1B. The emergency vehicle warning device 106 may otherwise be affixed to the emergency vehicle 102. The emergency vehicle warning device may be a component of apparatus 104. Apparatus 104 may send a communication signal to one or more Traffic Light Controllers. Apparatus 104 may send the signal by way of one or more communication mediums including but not limited to radio, infrared, UHF, VHF, WIFI, and the like. Additionally, wireless signals communication media may include wired media such as a wired network or direct-wired connection, and wireless media such as acoustic, radio frequency (RF), infrared, and other wireless media, over a network using a server 110, or cloud computing.

In various aspects, the system may be configured to operate by placing a vehicle module having a GPS and a LORA transceiver in the emergency vehicle (EV) and a control module having a GPS, LORA transceiver, and lights (used to notify drivers in and around the intersection) contained within a housing that can be mounted in intersections. As an emergency vehicle approaches an intersection the LORA transceiver in the vehicle module, which may be constantly broadcasting the location of the EV, is picked up by the LORA transceiver in control module at the intersection to them activate onboard lights to notify vehicles at or near the intersection of any approaching emergency vehicle. A controller and electrical system in the control module at the intersection may then perform calculation to determine the direction that the emergency vehicle is coming from, such as, for example, based at least on the coordinates transmitted from the vehicle module. The control module controller and electronics may be configured and calibrated upon installation such that the orientation of the control module is known. The control module may then activate the onboard lights to notify vehicles at or near the intersection of any approaching emergency vehicle. In an exemplary embodiment, the notification may be done using at least two colors of lights which may be produced using LED light strips which face oncoming traffic in each of the four directions traffic can enter the intersection. All of the first colored lights may turn on to notify nearby vehicles that an emergency vehicle is coming, and the second colored lights may light up only on one of the four sides to signal the side the emergency vehicle is approaching from so vehicles on that side will know and can respond accordingly.

In various embodiments, the devices and/or systems may include a controller or electronic controller to receive the communications from the control modules and other devices, to pass them on as instructions to the systems components, to receive information from the components, and/or to send information. The controller may include elements to carry out its function. For example, the controller may include a circuit board, sensor, receiver/transmitter, transceiver, and/or antenna for wireless communication. The controller may include "smart" technology such as a microprocessor, etc. to process and execute the instructions, information, and/or signal received from the control module or wireless unit or the information received from the device and system components. As another example, the controller may be connected respectively by one or more wires (and/or other transmitters or carriers) to the one or more system components to transmit instructions/information to the system components and/or to receive information from them.

Figure 2:
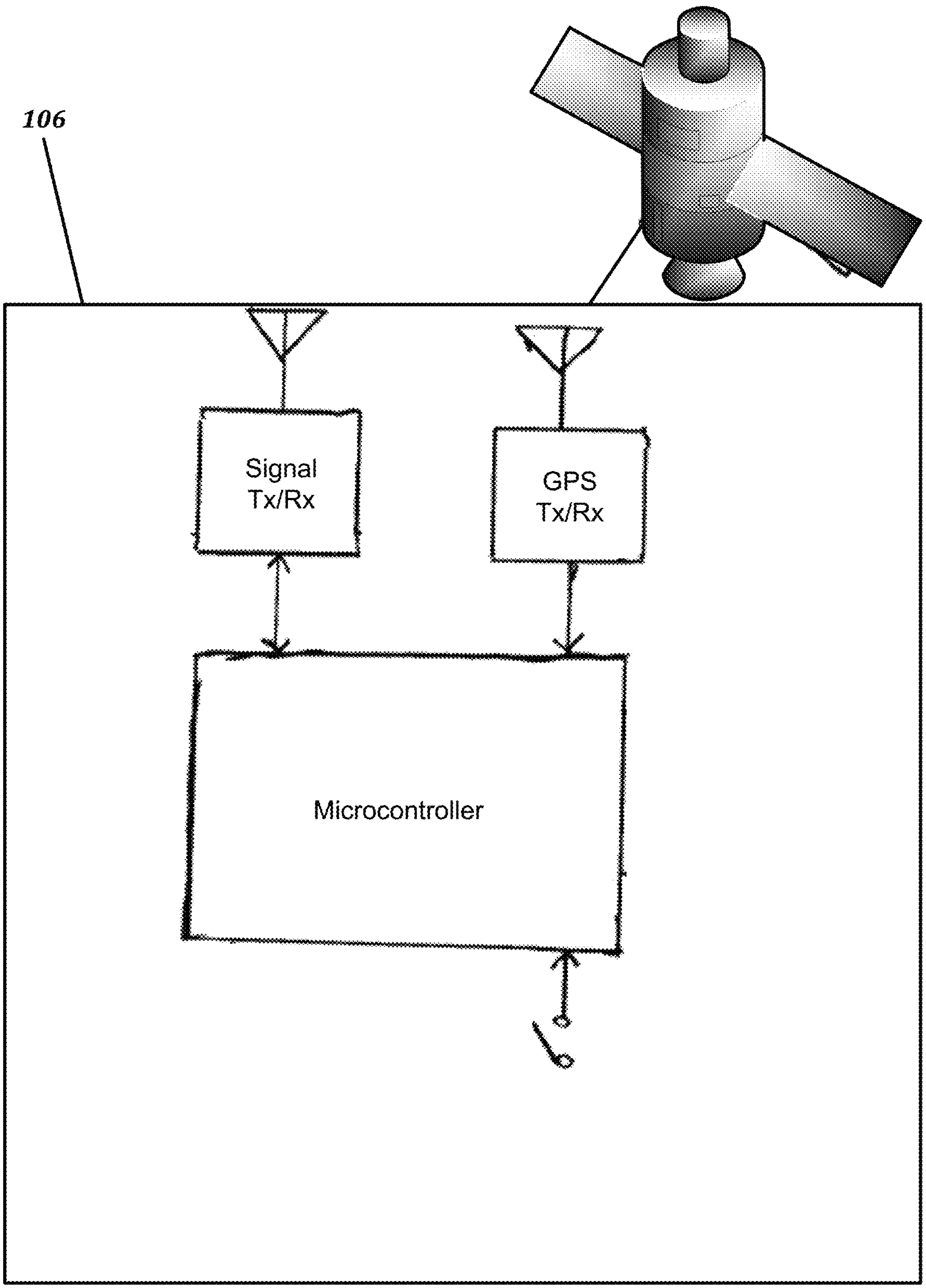
FIGS. 2 shows a depiction of a method of providing an emergency vehicle warning indication system in accordance with an exemplary embodiment of the present invention.
Figure 3:
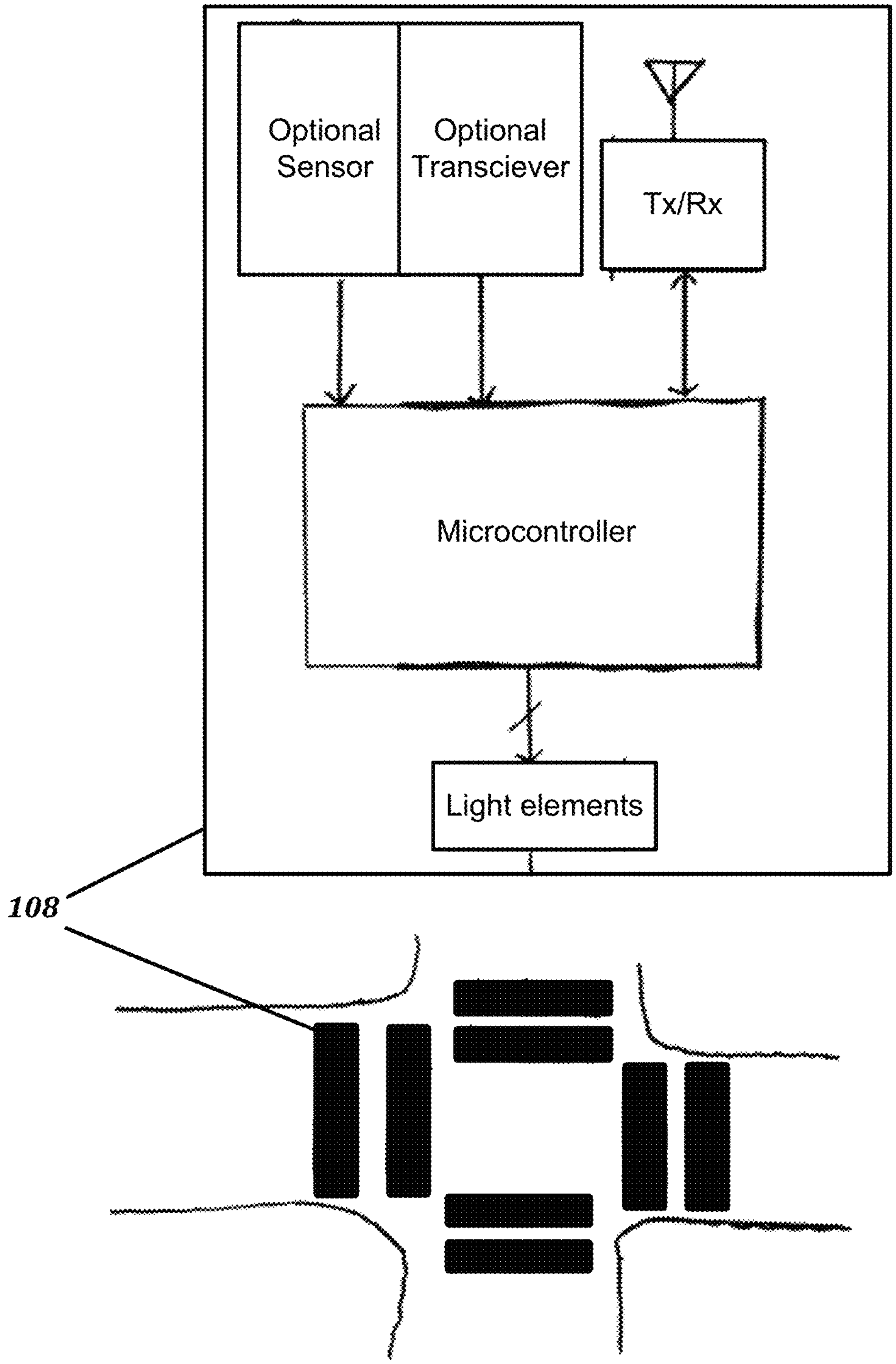
FIG. 3 shows a depiction of an emergency vehicle warning indication system in accordance with an exemplary embodiment of the present invention.
Figure 4:
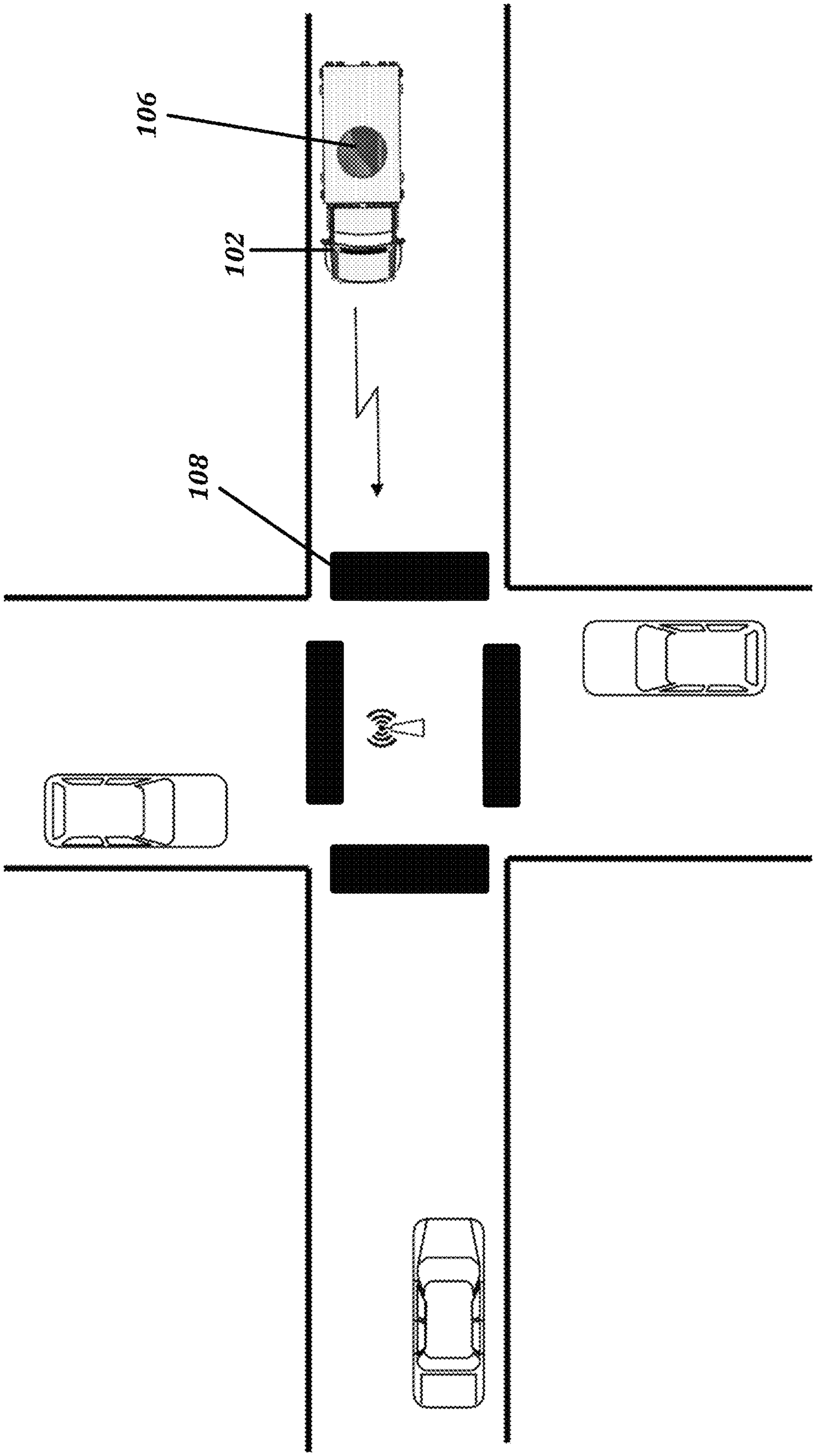
FIG. 4 shows a depiction of a method of providing an emergency vehicle warning indication system in accordance with an exemplary embodiment of the present invention.

As depicted in FIG. 2, a method for providing an emergency vehicle warning indication system may be provided comprising:

- receiving a signal from an emergency vehicle at a predetermined distance;
- determining based on the signal that the emergency vehicle is approaching an intersection;
- overriding a traffic signal at the intersection to constant red;
- flashing one or more lights at the traffic signal; and
- sending a signal from an emergency vehicle to one or more traffic signal.

The emergency vehicle warning indication system may comprise one or more of: an in-cab module or transponder;

- an emergency vehicle module or transponder;
- an acoustic detection device;
- a strobe safety beacon light assembly;
- a communication device; and
- a traffic signal controller.

The in-cab module or transponder may be configured such that it can provide siren detection. The in-cab module or transponder may be further configured to operate with a high rate of reliability utilizing low-power sources. The in-cab module or transponder may be configured to operate 24/7 using a solar battery and/or internal battery sources.

An Emergency Vehicle module or transponder may be configured such that an emergency vehicle intersection warning system is provide allowing for detection of an intersection. The emergency vehicle module or transponder may be configured to receive, send, and accept signals from existing vehicle transmitters. The emergency vehicle module or transponder may be configured such that is compatible with existing communication systems.

An acoustic detection device further comprising a machine learning module. The machine learning module configured such that artificial intelligence may be trained to determine the difference between the sound of a siren and sounds that aren't sirens. The machine learning module may be configured such that it can adapt to sirens that are not part of a siren sound database. The acoustic detection device may in another aspect comprise a digital signal processor. The digital signal process may be configured to key in on specific characteristics of the sound.

The emergency vehicle warning indication system may be enabled to sense an approaching Emergency Vehicle (EV). The emergency vehicle warning indication system may be configured such that the emergency vehicle module or transponder can receive and process the following emergency vehicle signals including but not limited to: an audible siren (wherein the audible siren may be encoded); white strobes (wherein the strobe light may be encoded); visible red/blue flash; visible red/blue rotation; RF signal (wherein the RF signal may further comprise frequency and coding); ultrasonic signal (wherein the ultrasonic signal may further comprise frequency and coding); infrared signal (wherein the infrared signal may further comprise wavelength and coding).

The emergency vehicle warning indication device 106 may further comprise a weather tight housing wherein the weather tight housing protects against dust ingress as well as against splash water from any directions. The emergency vehicle warning indication device may further comprise a universal mounting wherein the universal mounting may be configured to easily be mounted to sign-posts, light poles, light pole booms, and any like member.

The emergency vehicle warning indication device 106 may be configured such that it should reliably operate up to at least 50 activations per day, every day, for at least three years. The emergency vehicle warning indication device 106 may be further configured such that it can have a long standby time. The emergency vehicle warning indication device 106 may be configured such that it can reliably operate after a long period of being inoperative. For example, the emergency vehicle warning indication device 106 may be reliably operated at least up to 25 activations, having gone at least 30 days since last charge.

The emergency vehicle warning indication device 106 may be self-recharging using an internal or solar battery. The emergency vehicle warning indication device 106 may be configured such that the power must self-replenish charge without intervention. For example, the emergency vehicle warning indication device 106 may be configured to get at least 50 activations from at least 12 hours of exposure to sunlight.

The emergency vehicle warning indication device 106 may be heat resistant wherein it can safely operate in high temperature conditions. For example, the emergency vehicle warning indication device 106 may be configured to safely withstand at least a 2-year exposure to direct sunlight and at least 120-degrees Fahrenheit ambient (plus accumulated internal heat production). Furthermore, the emergency vehicle warning indication device 106 may be freeze tolerant wherein it can safely operate in sub-freezing conditions. For example, the emergency vehicle warning indication device 106 may be configured to safely withstand annually at least 4-months exposure to freezing conditions.

The emergency vehicle warning indication platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the emergency vehicle warning indication platform 100 may be hosted on a centralized server, such as, for example, a cloud computing service. Although method 200 has been described to be performed by a computing device 500, it should be understood that, in some embodiments, different operations may be performed by different networked elements in operative communication with computing device 500.

Embodiments of the present disclosure may comprise a system having a memory storage and a processing unit. The processing unit coupled to the memory storage, wherein the processing unit is configured to perform the stages of method 200.

Figure 5:
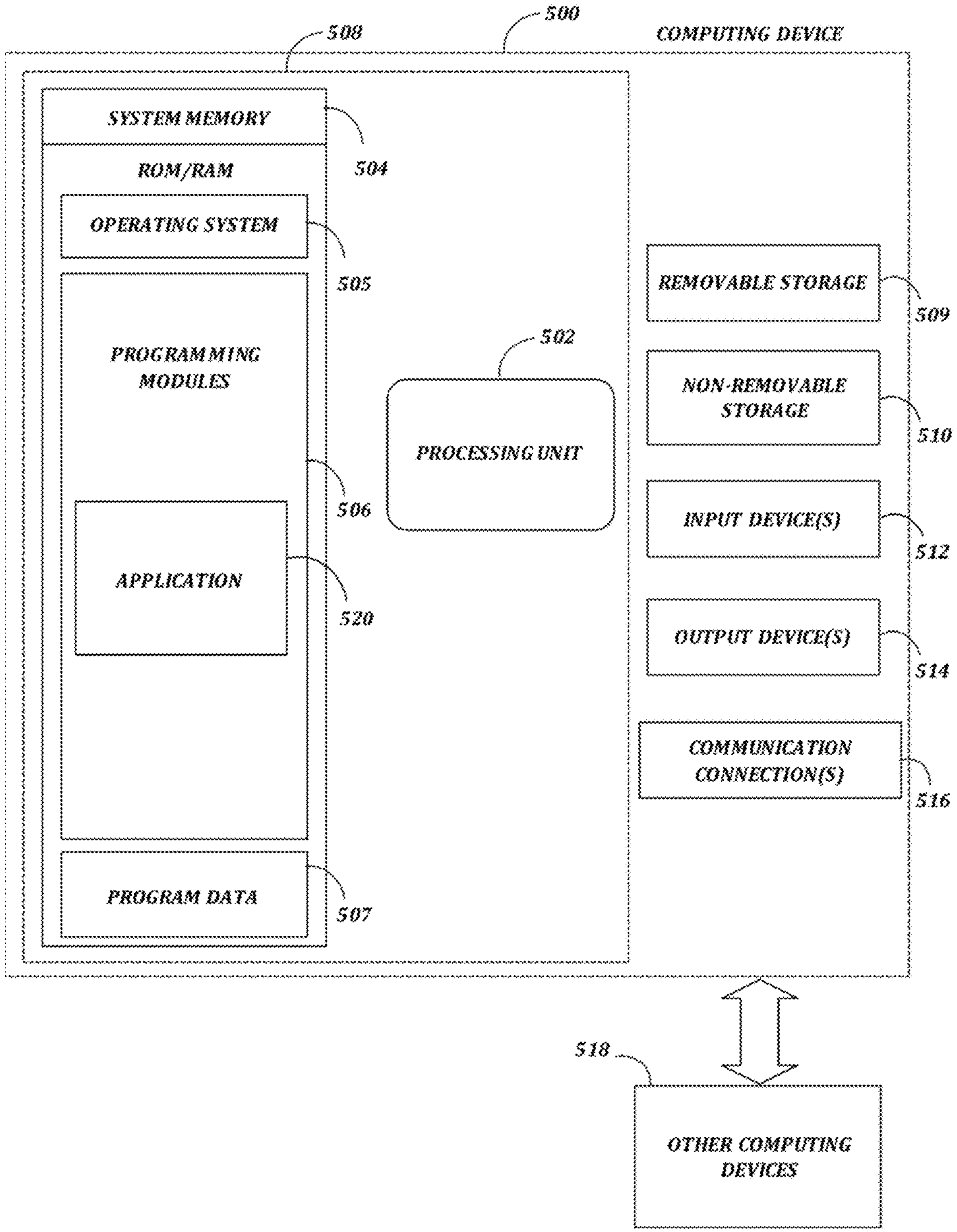
FIG. 5 shows a depiction of a computing device performing a method of providing an emergency vehicle warning indication system in accordance with an exemplary embodiment of the present invention.
Figure 6:
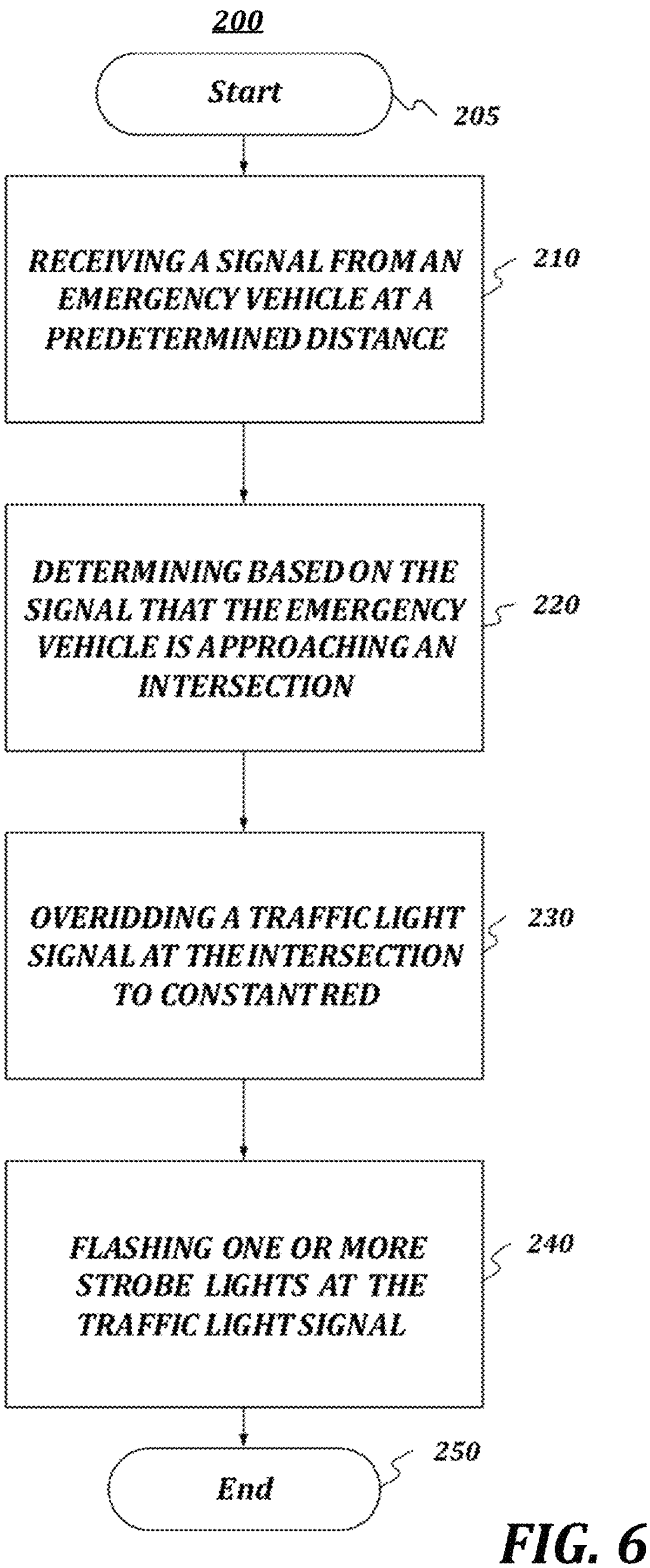
FIG. 6 shows a depiction of an emergency vehicle warning indication system in accordance with an exemplary embodiment of the present invention.

FIG. 5 is a block diagram of a system including computing device 500. Consistent with an embodiment of the disclosure, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the disclosure.

With reference to FIG. 5, a system consistent with an embodiment of the disclosure may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include programming modules that could enable the disclosure, for example an emergency transmitter module, traffic signal control module, or emergency strobe beacon control module, etc. as part of application 520. Furthermore, embodiments of the disclosure may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g., an emergency transmitter module, traffic signal control module, or emergency strobe beacon control module, etc. as part of application 520) may perform processes including, for example, one or more of method 200's stages as described above. The aforementioned process is an example, and processing unit 502 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

III. Platform Operation and Methods for Use

The present disclosure, according to further aspects, also provides methods of using the disclosed devices and systems. In various aspects, the disclosed emergency vehicle warning indication devices and systems can be used for alerting motorists and pedestrians of approaching emergency vehicles at an intersection.

In further aspects, an emergency vehicle (EV) may approaching an intersection, (such as a 4-way intersection) in response to a call. The EV and the intersection are equipped with the disclosed system. In still further aspects, the EV is approaching the intersection, intending to go straight through the intersection in response to a call. The system may be activated either automatically or manually by someone in the cab of the EV, or possibly even remotely by a dispatch operator, or via GPS signals and a central processing system connected via wireless technology.

Once the EV is within a predetermined distance, the intersection activates an intersection control module or lighting assembly with a system of blinking or strobing lights. These lights raise the awareness of any people in the intersection. The lights may also convey a directionality (i.e. the pattern of lights may change depending on what direction the EV is coming from, or depending on which direction the EV intends to go once it arrives at the intersection).

In one aspect, disclosed herein is a method for providing an emergency vehicle warning indication system. FIG. 2 is a flow chart setting forth the general stages involved in a method 200 consistent with an embodiment of the disclosure for providing emergency vehicle warning indication platform 100. Method 200 may be implemented using a computing device 500 as described in more detail below with respect to FIG. 5.

Although method 200 has been described to be performed by computing device 500, it should be understood that, in some embodiments, different operations may be performed by different networked elements in operative communication with computing device 500. For example, server 110 and/or computing device 500 may be employed in the performance of some or all of the stages in method 200. Moreover, server 110 may be configured much like computing device 500 and, in some instances, be one and the same embodiment. Similarly, apparatus 104 may be employed in the performance of some or all of the stages in method 200. Apparatus 104 may also be configured much like computing device 500.

Although method 200 has been described to be performed by platform 100, it should be understood that computing device 500 may be used to perform the various stages of method 200. Furthermore, in some embodiments, different operations may be performed by different networked elements in operative communication with computing device 500. For example, server 110 may be employed in the performance of some or all of the stages in method 200. Moreover, server 110 may be configured much like computing device 500. Similarly, apparatus 104 may be employed in the performance of some or all of the stages in method 200. Apparatus 104 may also be configured much like computing device 500.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 200 will be described in greater detail below.

Method 200 may begin at starting block 205 and proceed to stage 210 where computing device 500 may receive a signal from an emergency vehicle at a predetermined distance. For example, receiving a signal from a dispatcher or other user about an approaching emergency vehicle.

From stage 210, where computing device 500 received a signal from an emergency vehicle at a predetermined distance, method 200 may advance to stage 220 where computing device 500 may determine based on the signal that the emergency vehicle is approaching an intersection. For example, determining an emergency vehicle is within half a mile, or five hundred yards from an intersection.

Once computing device 500 determined based on the signal that the emergency vehicle is approaching an intersection in stage 220, method 200 may continue to stage 230 where computing device 500 may override a traffic signal at the intersection to constant red. For example, changing the traffic signal system to red lights after making the determination that an emergency vehicle is approaching the intersection.

After computing device 500 override a traffic signal at the intersection to constant red in stage 230, method 200 may proceed to stage 240 where computing device 500 may activate a visual notification by flash one or more lights at the traffic signal. For example, an intersection control module or light assembly may be affixed to one or more traffic signals at an intersection such that they are activated once the determination is made that an emergency vehicle is approaching said intersection. Once computing device 500 transmits a visual notification at the traffic signal in stage 240, method 200 may then end at stage 250.

In further aspects, as the emergency vehicle engages the emergency intersection warning lights from 150 to 200 yards, warning lights flash (e.g., Blue and Yellow lights) and intensifies from slow to rapid (giving an awareness of time for the emergency vehicle to enter the intersection). In still further aspects, other remaining lights (i.e. 3 other Blue lights) may intensify their flash in the same fashion.

In various embodiments, the platform may be configured to handle multiple emergency vehicles approaching an intersection. In some aspects, the platform may give priority to one EV over another. In other aspects, the platform may default to a “multiple EVs” mode of visual notification, or strobe/flashing pattern.

By way of non-limiting example, 1st and 2nd emergency vehicles may approach a multi-way intersection (i.e., a 4 or 5 way intersection) having the system installed. In further aspects, 1st emergency vehicle traveling north may engage the system or an intersection module first, causing a first activation of the emergency intersection warning lights. After, a few seconds later 2nd emergency vehicle traveling west (as the lights from the $1^{st}$ activation are already flashing) engage the system or an intersection module, causing a second activation of emergency intersection warning lights from 150 to 200 yards, wherein immediately adjacent to the activated warning lights appears another visual notification of amber arrow pointing south (giving indication of an oncoming north bound emergency vehicle). In further aspects, at the moment 2nd emergency vehicle traveling west engages the system, simultaneously for the 1st emergency vehicle traveling north another visual notification appears showing an amber arrow pointing east (giving indication of an oncoming West bound emergency vehicle).

The moment the 1st emergency vehicle clears the intersection, a yellow warning light from the system for the 2nd emergency vehicle traveling west bound may begin to flash (blue lights being activated at this point) as the other blue lights would intensify its flash the same as the 2nd emergency vehicle now takes command of the intersection module (a change of light command has been taken place).

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

What is claimed:

1. An emergency vehicle warning system comprising:
at least one vehicle control module comprising:
a wireless transceiver;
a GPS transceiver;
a controller; and
a switch in operable communication with the controller for activating the vehicle control module; and
at least one intersection control module configured to be connected with at least one traffic light located at a traffic intersection, the intersection control module comprising:
the at least one traffic light, including a plurality of primary light elements;
a wireless transceiver and/or receiver;
a controller;
a plurality of secondary light elements;
a GPS transceiver;
a housing; and
an optional switch in operable communication with the controller for activating the intersection control module;
wherein the housing comprises the secondary light elements on front and rear faces of the housing, allowing different notifications to be transmitted in opposite directions;
wherein the intersection control module is configured to transmit a visual notification comprising activation of one or more light elements, of the plurality of secondary light elements, associated with a determined distance between the vehicle control module and the intersection control module; and
wherein the plurality of secondary light elements is configured to convey a directionality using a pattern of secondary light elements associated with the distance between the GPS transceiver of the vehicle control module and GPS transceiver of the intersection control module.

2. The system of claim 1, wherein the vehicle control module is configured to mount to an emergency vehicle and transmit or broadcast location data associated with the location of the emergency vehicle to the intersection control module.

3. The system of claim 2, wherein the intersection control module is configured to determine a location, speed, or direction of an emergency vehicle having a vehicle control module when said emergency vehicle is within a predetermined distance or meets predetermined criteria, or a combination thereof.

4. The system of claim 3, wherein the vehicle control module and intersection control module cooperate to determine location, speed, or direction of the emergency vehicle.

5. The system of claim 4, wherein the intersection control module is configured to transmit a visual notification comprising activation of one or more of the plurality of secondary light elements to notify vehicles nearby the intersection of one or more approaching emergency vehicles having a vehicle control module.

6. The system of claim 5, wherein at least one of the wireless transceiver of the vehicle control module or the wireless transceiver of the intersection control module comprises a radio transceiver or laser transceiver, or a combination thereof.

7. The system of claim 6, wherein the intersection control module comprises at least one sensor selected from an image sensor, a sound sensor, or a lidar sensor.

8. The system of claim 7, wherein the plurality of lighting elements comprises LED light strips which face oncoming traffic in a direction traffic enters an intersection.

9. The system of claim 8, wherein the controller of the vehicle control module is configured to be communicatively connected to one or more of: traffic signals and vehicle control module components.

10. An Emergency Vehicle Warning system, comprising:

at least one vehicle control module comprising:
- a radio transceiver;
- a GPS transceiver;
- a controller; and
- a switch in operable communication with the controller for activating the vehicle control module; and at least one intersection control module configured to be connected with at least one traffic light located at 4-way traffic intersection, each intersection control module comprising:
- the at least one traffic light, comprising a plurality of primary light elements;
- a radio transceiver;
- a GPS transceiver;
- a controller; and
- a lighting assembly comprising a plurality of secondary light elements and a housing including the secondary light elements on front, rear, and two side faces, allowing different notifications to be transmitted to traffic going in 4 directions;

wherein the vehicle control module is configured to mount to an emergency vehicle and transmit or broadcast location data associated with the location of the emergency vehicle to the intersection control module; and wherein the intersection control module is configured to monitor a distance between the GPS transceiver of the vehicle control module and the GPS transceiver of the intersection control module to determine when said emergency vehicle is within a predetermined distance or meets predetermined criteria, or a combination thereof;

wherein the intersection control module is configured to transmit a visual notification associated with the predetermined criteria of the emergency vehicle monitored by the intersection control module, the visual notification-comprising activation of one or more of the plurality of secondary light elements to notify vehicles nearby the intersection of one or more approaching emergency vehicles; and wherein the plurality of secondary light elements is configured to convey a directionality using a pattern of the secondary light elements associated with the monitored distance between the GPS transceiver of the vehicle control module and the GPS transceiver of the intersection control module.

11. The system of claim 10, wherein the vehicle control module and intersection control module cooperate to determine location, speed, or direction of the emergency vehicle.

12. The system of claim 11, wherein the intersection control module is configured to calculate which direction an emergency vehicle is coming from based at least on coordinate data associated with the emergency vehicle.

13. The system of claim 12, wherein the intersection control module is configured to transmit a visual notification comprising activation of one or more of the plurality of secondary light elements to notify vehicles nearby the intersection of one or more approaching emergency vehicles having a vehicle control module.

14. The system of claim 13, wherein the intersection control module comprises at least one sound sensor configured to detect an emergency siren.

15. The system of claim 14, wherein upon meeting predetermined notification criteria, the intersection control module is configured to transmit a visual notification comprising at least activation of one or more of the plurality of secondary light elements to notify vehicles nearby the intersection of one or more approaching emergency vehicles having a vehicle control module.

16. The system of claim 15, wherein the system comprises an intersection control module facing in each direction of traffic, and wherein each lighting assembly comprises LED light strips which face oncoming traffic.

17. The system of claim 16, wherein the intersection control module is configured to transmit a different visual notification based on the direction, location, proximity, and number of emergency vehicles entering the intersection.

* * * * *